United States Patent
Shim et al.

(10) Patent No.: US 9,448,347 B2
(45) Date of Patent: Sep. 20, 2016

(54) POLARIZING PLATE

(71) Applicant: LG CHEM, LTD., Seoul (KR)

(72) Inventors: Hwa-Sub Shim, Daejeon (KR); Yi-Rang Lim, Daejeon (KR); Jun-Wuk Park, Daejeon (KR); Kyoung-Won Kim, Daejeon (KR); Sung-Hyun Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 292 days.

(21) Appl. No.: 14/376,585

(22) PCT Filed: May 13, 2014

(86) PCT No.: PCT/KR2014/004265
§ 371 (c)(1),
(2) Date: Aug. 4, 2014

(87) PCT Pub. No.: WO2014/185685
PCT Pub. Date: Nov. 20, 2014

(65) Prior Publication Data
US 2016/0231484 A1  Aug. 11, 2016

(30) Foreign Application Priority Data

May 14, 2013  (KR) .................. 10-2013-0054214

(51) Int. Cl.
*G02F 1/00*   (2006.01)
*G02B 5/30*   (2006.01)
*G02B 27/28*  (2006.01)

(52) U.S. Cl.
CPC ............. *G02B 5/305* (2013.01); *G02B 5/3041* (2013.01)

(58) Field of Classification Search
CPC .... G02B 5/30; G02B 5/3008; G02B 5/3016; G02B 5/3025; G02B 5/3033; G02B 5/3041; G02B 5/305; G02B 5/3058; G02B 5/3066; G02B 5/3075; G02B 5/3083; G02B 5/3091; G02B 5/32
USPC .......................................... 359/483–493, 321
See application file for complete search history.

(56) References Cited

U.S. PATENT DOCUMENTS

| | | | |
|---|---|---|---|
| 6,180,244 B1 | 1/2001 | Rayner et al. | |
| 2002/0110685 A1* | 8/2002 | Ebihara | C08J 7/04 428/336 |
| 2007/0184212 A1* | 8/2007 | Nimura | G02B 5/3033 428/1.31 |
| 2011/0019280 A1 | 1/2011 | Lockridge et al. | |

FOREIGN PATENT DOCUMENTS

| | | |
|---|---|---|
| CN | 101981476 A | 2/2011 |
| CN | 102417807 A | 4/2012 |
| JP | 2010-143955 A | 7/2010 |
| KR | 10-2011-0002032 A | 1/2011 |
| KR | 10-2012-0030937 A | 3/2012 |
| KR | 20120030937 A | 3/2012 |
| WO | 2009123921 A1 | 10/2009 |

* cited by examiner

*Primary Examiner* — Bumsuk Won
*Assistant Examiner* — Collin X Beatty
(74) *Attorney, Agent, or Firm* — Dentons US LLP

(57) ABSTRACT

The present disclosure relates to a polarizing plate including: a polarizer; an acrylic film attached to at least one surface of the polarizer via an adhesive layer; and a primer layer formed on at least one surface of the acrylic film, wherein the primer layer is formed of a primer composition including a water dispersible resin containing a sulfonic acid group, water dispersible particles, and water, and a weight ratio of the water dispersible resin to the water dispersible particles is in a range of 1:0.01 to 5:1.

8 Claims, No Drawings

POLARIZING PLATE

This application is a National Stage Application of International Patent Application No. PCT/KR2014/004265, filed on May 13, 2014, and claims the benefit of Korean Patent Application No. 10-2013-0054214, filed on May 14, 2013, in the Korean Intellectual Property Office, all of which are incorporated herein by reference in their entirety.

TECHNICAL FIELD

The present disclosure relates to a polarizing plate and more particularly, to a polarizing plate including an acrylic film and an aqueous primer layer containing a sulfonic acid group ($SO_3^-$).

BACKGROUND ART

Polarizing plates generally have a structure in which a protective film is stacked on one surface or both surfaces of a polarizer formed of a polyvinyl alcohol (hereinafter, referred to as 'PVA') resin dyed with a dichroic dye or iodine, using an adhesive. Triacetyl cellulose (TAC) films have mainly been used as protective films for polarizing plates according to the related art, but such TAC films may be easily deformed in high temperature and high humidity environments. Thus, in recent years, various materials of protective films capable of replacing the TAC films have been developed, and for example, methods of using polyethylene terephthalate (PET), a cycloolefin polymer (COP), an acrylic film or the like alone or combinations thereof have been suggested.

However, these protective films are disadvantageous in that sufficient adhesion with respect to aqueous adhesives which have commonly been used for adhesion between PVA films and protective films in the related art may not be secured. In order to solve such disadvantages, a method of forming a primer layer on a surface of polyethylene terephthalate (PET), a cycloolefin polymer (COP), an acrylic film or the like, using a polyurethane primer containing a carboxylic group and increasing adhesion between a protective film and an aqueous adhesive has been proposed.

Meanwhile, since polyethylene terephthalate (PET), a cycloolefin polymer (COP), an acrylic film and the like may have a level of moisture permeability lower than that of TAC and accordingly, in the case of using the aqueous adhesive, moisture contained in the aqueous adhesive may not penetrate through the film, thereby leading to difficulties in the drying thereof. Accordingly, of late, non-aqueous adhesives for replacing aqueous adhesives have been developed.

However, in the case of urethane primers including a carboxylic group, developed according to the related art, they have superior adhesive properties with respect to aqueous adhesives but insufficient adhesive properties with respect to non-aqueous adhesives. Further, since the urethane primers including a carboxylic group may have low levels of water resistance and solvent resistance properties, in a case in which such urethane primers are maintained under high humidity conditions for a relatively long period, adhesion thereof or the like may be deteriorated due to the penetration of moisture.

In addition, the polarizer protective film as described above may include a variety of functional coating layers such as a reflection prevention layer, a hard coating layer and the like, on a surface opposite to a surface to which the polarizer is attached, in terms of reflection prevention, improvements in durability, scratch prevention, an increase in visibility and the like. The functional coating layers may be generally formed by a method of coating a coating composition including a base resin, a solvent, an additive and the like on a protective film and subsequently curing the composition. However, depending on types of the protective film, some cases in which adhesion of the protective film with respect to these functional coating layers may be insufficient may be caused and in such cases, the functional coating layers may be delaminated from the protective film or damaged to thereby degrade functionality of a polarizing plate.

In order to solve these defects, methods of performing a surface treatment such as a plasma treatment, a corona treatment or the like or forming a primer layer on a surface of a protective film have been proposed, but in the case of methods proposed to date, sufficient adhesion between the protective film, in particular, an acrylic protective film and a functional coating layer may not be secured. For example, in the polyurethane primer containing a carboxylic group, when a coating composition including an organic solvent is coated on a primer layer, since the primer layer may be swollen due to the solvent contained in the coating composition, a coated exterior may be defective or the primer layer may be detached from the protective film due to the dissolution of the primer layer in the coating composition.

DISCLOSURE

Technical Problem

An aspect of the present disclosure provides a polarizing plate having superior water resistance and solvent resistance properties while having a high level of adhesion between a protective film and a non-aqueous adhesive layer and/or a functional coating layer to thereby exhibit excellent durability able to be maintained over a relatively long period of time.

Technical Solution

According to an aspect of the present disclosure, a polarizing plate may include a polarizer; an acrylic film attached to at least one surface of the polarizer via an adhesive layer; and a primer layer formed on at least one surface of the acrylic film, wherein the primer layer is formed of a primer composition including a water dispersible resin containing a sulfonic acid group, water dispersible particles, and water, and a weight ratio of the water dispersible resin to the water dispersible particles is in a range of 1:0.01 to 5:1.

The water dispersible resin may include 1 wt % to 20 wt % of monomers containing the sulfonic acid group.

The water dispersible resin may be at least one selected from a group consisting of a polyester resin, a polyurethane resin, and a polyacrylic resin. The polyester resin may includes a repeating unit represented by Chemical Formula 1:

[Chemical Formula 1]

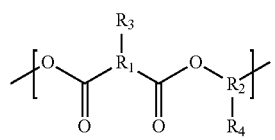

where $R_1$ and $R_2$ each independently indicate hydrogen, a substituted or unsubstituted $C_{1-20}$ alkyl group, a substituted or unsubstituted $C_{1-20}$ aryl group or a substituted or unsubstituted $C_{3-20}$ cycloalkyl group, $R_3$ and $R_4$ each independently indicate hydrogen, a substituted or unsubstituted $C_{1-20}$ alkyl group, a substituted or unsubstituted $C_{1-20}$ aryl group or a substituted or unsubstituted $C_{3-20}$ cycloalkyl group, or a sulfonate group, and at least one of $R_3$ and $R_4$ is a sulfonate group.

The water dispersible resin may be a polyester-acrylic copolymer resin containing an ester repeating unit and an acrylic repeating unit. The water dispersible resin may be a polyester-urethane copolymer resin containing an ester repeating unit and a urethane repeating unit.

The water dispersible particles may have an average diameter of 10 nm to 200 nm. Specific Examples of the water dispersible particles may include at least one type of inorganic particles selected from a group consisting of silica particles, titania particles, alumina particles, zirconia particles, and antimony particles; at least one type of organic particles selected from a group consisting of a silicon resin, a fluorinated resin, a (meth)acrylic resin, a cross-linked polyvinyl alcohol resin and a melamine resin; or combinations thereof.

The polarizing plate may further include a functional coating layer on a surface of the acrylic film, opposite to the surface thereof disposed toward the polarizer. The functional coating layer may be for example, a hard coating layer, a reflection prevention layer or the like.

The acrylic film is not limited to, but may include a copolymer including a 3- to 6-membered hetero ring unit substituted with an alkyl(meth)acrylate unit and at least one carbonyl group. If necessary, the acrylic film may further include an aromatic resin having a carbonate unit in a main chain thereof.

Advantageous Effects

In the polarizing plate according to an exemplary embodiment of the present disclosure, a primer layer may be formed on at least one surface of an acrylic film, using an aqueous primer composition including a sulfonic acid group, such that a high level of adhesion between the acrylic film and a non-aqueous adhesive layer and/or a functional coating layer may be secured, superior water resistance and solvent resistance properties may be exhibited, sufficient adhesive strength may be implemented without the use of an additive such as a cross-linking agent, and stable durability may be maintained over a relatively long period of time.

BEST MODE

Hereinafter, exemplary embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

As a result of repeated research in order to develop a polarizing plate having superior water resistance and solvent resistance properties and excellent durability even with the use of an acrylic film as a protective film, the inventors of the disclosure found that in the case of using a primer composition including a water dispersible resin containing a sulfonic acid group serving as an ionic functional group, as a base resin, adhesion between the acrylic film and an adhesive layer and/or a functional coating layer could be significantly improved, and then completed the disclosure.

More specifically, the polarizing plate according to an embodiment of the present disclosure may include: a polarizer; an acrylic film attached to at least one surface of the polarizer via an adhesive layer; and a primer layer formed on at least one surface of the acrylic film and in this case, the primer layer may be formed of a primer composition including a water dispersible resin containing a sulfonic acid group.

More specifically, in an exemplary embodiment of the present disclosure, the primer composition may include a water dispersible resin containing a sulfonic acid group, water dispersible particles, and water. A weight ratio of the water dispersible resin to the water dispersible particles may be within a range of 1:0.01 to 5:1. In this case, the weight ratio of water dispersible resin to water dispersible particles may refer to a solid weight ratio.

Meanwhile, in an exemplary embodiment of the present disclosure, types of the water dispersible resin are not particularly limited, as long as it may contain a sulfonic acid group as an ionic functional group. For example, the water-dispersible resin according to an exemplary embodiment of the present disclosure may be a polyester resin, a polyurethane resin, an acrylic resin or the like.

In this case, the polyester resin refers to a resin including an ester group formed through a reaction between a carboxylic group and alcohol, in a main chain thereof. The polyester resin may be preferably a water dispersible polyester resin and more preferably, may include polyester glycol formed through reaction between a polybasic acid and a polyol.

In this case, the polybasic acid component may be, for example, an aromatic dicarboxylic acid such as orthophthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid, tetrahydrophthalic acid or the like; an aliphatic dicarboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, itaconic acid or the like; an alicyclic dicarboxylic acid such as hexahydrophthalic acid, tetrahydrophthalic acid, 1,3-cyclohexane dicarboxylic acid, 1,4-cyclohexane dicarboxylic acid or the like; or a reactive derivative thereof such as an acid anhydride, an alkyl ester, an acid halide, or the like. These components may be used alone or in a combination of two or more thereof. Among these components, the polybasic acid component may be preferably terephthalic acid, isophthalic acid, succinic acid, or the like. Further, in a case in which isophthalic acid substituted with sulfonate is used as the basic acid, the case may be preferable in terms of water dispersibility.

Meanwhile, the polyol is not particularly limited, as long as it has two or more hydroxyl groups within a molecule, and any appropriate polyol may be used therefor. For example, the polyol may be at least one selected from a group consisting of ethylene glycol, 1,2-propanediol, 1,3-propanediol, 1,3-butanediol, 1,4-butanediol, neopentyl glycol, pentane diol, 1,6-hexane diol, 1,8-octane diol, 1,10-decane diol, 4,4'-dihydroxy phenyl propane, 4,4'-dihydroxy methyl methane, diethylene glycol, triethylene glycol, polyethylene glycol (PEG), dipropylene glycol, poly tetra methylene glycol (PTMG), polypropylene glycol (PPG), 1,4-cyclohexane dimethanol, 1,4-cyclohexane diol, bisphenol A, bisphenol F, glycerin, 1,1,1-trimethylolpropane, 1,2,5-hexatriol, pentaerythriol, glucose, sucrose, and sorbitol. Further, in a case in which dimethylol alkanoic acid, dimethylol acetic acid, dimethylol propionic acid, dimethylol butanoic acid or the like, containing a carboxylic group is used alone or a combination of two or more thereof is used as the polyol, the case may be preferable in terms of water dispersibility.

Among these, the polyol may be at least one selected from a group consisting of poly tetra methylene glycol (PTMG), polypropylene glycol (PPG), and polyethylene glycol (PEG).

Meanwhile, the polyester glycol may be formed by a reaction between the polybasic acid and the polyol in a molar ratio in the range of 2.5:1 to 1:2.5, preferably, in a molar ratio in the range of 2.3:1 to 1:2.3, more preferably, in a molar ratio in the range of 2:1 to 1:2. In a case in which the molar ratio of the reaction between the polybasic acid and the polyol is outside of the numerical range, an undesirable smell may be caused due to non-reactive monomers or coating defects may occur.

As methods of manufacturing such a polyester resin, any appropriate method known in the technical field may be used. For example, the polyester resin according to an exemplary embodiment of the present disclosure may be manufactured by esterification of the polybasic acid and the polyol, followed by polycondensation or may be manufactured by esterification of a polybasic acid anhydride and the polyol, followed by polycondensation. More specifically, the methods may include (1) a raw material mixing process of mixing raw polymerization materials for the polymerization of polyester to obtain a raw material mixture, (2) an esterification process of etherifying the raw material mixture, and (3) a polycondensation process of performing polycondensation on the esterified raw material mixture to obtain polyester.

Meanwhile, the polyester resin manufactured by the method as described above and used in the exemplary embodiment of the present disclosure may include: a repeating unit represented by the following [Chemical Formula 1]:

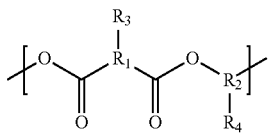

[Chemical Formula 1]

where $R_1$ and $R_2$ each independently indicate hydrogen, a substituted or unsubstituted $C_{1-20}$ alkyl group, a substituted or unsubstituted $C_{1-20}$ aryl group or a substituted or unsubstituted $C_{3-20}$ cycloalkyl group, $R_3$ and $R_4$ each independently indicate hydrogen, a substituted or unsubstituted $C_{1-20}$ alkyl group, a substituted or unsubstituted $C_{1-20}$ aryl group or a substituted or unsubstituted $C_{3-20}$ cycloalkyl group, or a sulfonate group, and at least one of $R_3$ and $R_4$ is a carboxyl group, a hydroxyl group or a sulfonate group. Among these, $R_3$ or $R_4$ may be preferably a carboxyl group or a sulfonate group.

More preferably, the polyester resin used in the exemplary embodiment of the present disclosure may include a repeating unit represented by the following [Chemical Formula 2]:

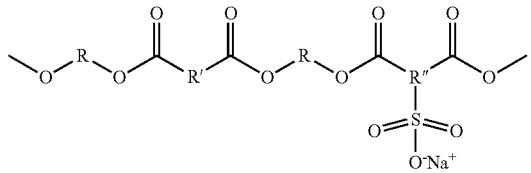

[Chemical Formula 2]

where R, R' and R" each independently indicate hydrogen, a substituted or unsubstituted $C_{1-20}$ alkyl group, a substituted or unsubstituted $C_{1-20}$ aryl group, a substituted or unsubstituted $C_{3-20}$ cycloalkyl group or the like.

Meanwhile, the polyester resin may further include additional components within a range in which properties of the present disclosure are not suppressed, in addition to the components as described above.

Next, the polyurethane resin refers to a resin including a urethane repeating unit formed by a reaction between a polyol and isocyanate and in this case, as the polyol, compounds including two or more hydroxyl groups may be used without limitations. For example, the polyol may be a polyester polyol, a polycarbonate polyol, a polyether polyol, a polyacrylic polyol or the like. As the isocyanate, any compound having two or more NCO groups may be used without limitations.

In this case, the isocyanate component may be one selected from a group consisting of toluene diisocyanate (TDI), 4,4-diphenyl methane diisocyanate (MDI), 1,5-naphthalene diisocyanate (NDI), tolidine diisocyanate (TODI), hexamethylene diisocyanate (HMDI), isopron diisocyanate (IPDI), p-phenylene diisocyanate, trans-cyclohexane, 1,4-diisocyanate and xylene diisocyanate (XDI), or a combination of two or more thereof.

Meanwhile, the polyester polyol may be obtained by reacting a polybasic acid with the polyol component and in this case, the polybasic acid component may be, for example, an aromatic dicarboxylic acid such as orthophthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid, tetrahydrophthalic acid or the like; an aliphatic dicarboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, itaconic acid or the like; an alicyclic dicarboxylic acid such as hexahydrophthalic acid, tetrahydrophthalic acid, 1,3-cyclohexane dicarboxylic acid, 1,4-cyclohexane dicarboxylic acid or the like; or a reactive derivative thereof such as an acid anhydride, an alkyl ester, an acid halide, or the like. These components may be used alone or in a combination of two or more thereof. Further, in a case in which isophthalic acid substituted with sulfonate is used as the basic acid, the case may be preferable in terms of water dispersibility.

Meanwhile, the polycarbonate polyol may be obtained by reacting a compound having a carbonate group with the polyol component and in this case, the compound having a carbonate group may be, for example, diphenyl carbonate, dialkyl carbonate, alkylene carbonate or the like.

In addition, the polyether polyol may be obtained by ring-opening polymerization of alkylene oxide on the polyol component.

Meanwhile, the polyol component is not particularly limited, as long as it has two or more hydroxyl groups within a molecule, and any appropriate polyol may be used therefor. For example, the polyol may be at least one selected from a group consisting of ethylene glycol, 1,2-propanediol, 1,3-propanediol, 1,3-butanediol, 1,4-butanediol, neopentyl glycol, pentane diol, 1,6-hexane diol, 1,8-octane diol, 1,10-decane diol, 4,4'-dihydroxy phenyl propane, 4,4'-dihydroxy methyl methane, diethylene glycol, triethylene glycol, polyethylene glycol (PEG), dipropylene glycol, poly tetra methylene glycol (PTMG), polypropylene glycol (PPG), 1,4-cyclohexane dimethanol, 1,4-cyclohexane diol, bisphenol A, bisphenol F, glycerin, 1,1,1-trimethylolpropane, 1,2,5-hexatriol, pentaerythriol, glucose, sucrose, and sorbitol. Among these, the polyol may be particularly at least one selected from a group consisting of poly(tetramethylene) glycol (PTMG), polypropylene glycol (PPG), and polyethylene glycol (PEG). Further, in a case in which the polyol component is sodium 2-hydroxy-3-(4-2-hydroxylethyl)-1-piperazinyl1-propane sulfonate containing sulfonate, the case may be preferable in terms of water dispersibility.

In addition, the polyacrylic polyol may be obtained by copolymerizing an acrylic monomer including a hydroxyl group or an acrylic monomer including a sulfonic acid group and a monomer including a hydroxyl group. In this case, the acrylic monomer and the monomer including a hydroxyl group may be used alone or in a combination of two or more thereof. In addition to the acrylic monomer, other monomers may be copolymerized. In this case, as the other monomers, unsaturated nitriles such as (meth) acrylonitrile and the like; unsaturated amides such as (meth) acryl amides and the like; olefins such as ethylene, propylene and the like; β-unsaturated aliphatic monomers such as halogenated vinyl chloride, vinylidene chloride and the like; and β-unsaturated aromatic monomers such as styrene, methyl styrene and the like; and the like may be used. These components may be used alone or in a combination of two or more thereof. In a case in which sodium vinyl sulfonate or sodium aryl sulfonate containing a sulfonate group, or the like is used, the case may be preferable in terms of water dispersibility.

Next, the acrylic resin refers to a resin including a repeating unit derived from a (meth) acrylate unit, and the acrylic resin according to an exemplary embodiment of the present disclosure may be obtained by for example, copolymerizing acrylic monomers or vinyl monomers containing a sulfonic acid group. These monomers may be used alone or in a combination of two or more thereof. In addition to the vinyl monomers, other monomers may be copolymerized. In this case, as the other monomers, unsaturated nitriles such as (meth) acrylonitrile and the like; unsaturated amides such as (meth) acryl amides and the like; β-unsaturated aliphatic monomers such as halogenated vinyl chloride, vinylidene chloride and the like; and β-unsaturated aromatic monomers such as styrene, methyl styrene and the like; and the like may be used. These monomers may be used alone or in a combination of two or more thereof. In a case in which sodium vinyl sulfonate or sodium aryl sulfonate containing a sulfonate group, or the like is used, the case may be preferable in terms of water dispersibility.

Meanwhile, the water dispersible resin according to an exemplary embodiment of the present disclosure may include two or more of an ester repeating unit, a urethane repeating unit, and an acrylic repeating unit. For example, the water dispersible resin according to an exemplary embodiment of the present disclosure may be a polyester-urethane copolymer resin containing an ester repeating unit and a urethane repeating unit, or may be a polyester-acrylic copolymer resin containing an ester repeating unit and an acrylic repeating unit, and may also include the three repeating units.

In an exemplary embodiment of the present disclosure, in a case in which the water dispersible resin is the polyester-urethane copolymer resin or the polyester-acrylic copolymer resin, solvent resistance and adhesion between the primer layer and a base film may be further improved, such that adhesion with respect to a non-aqueous adhesive layer and/or a functional coating layer may be further increased. In addition, since a primer layer formed using a primer composition containing the water dispersible resin as described above may have an excellent exterior of coating, optical properties of the polarizing plate may be further improved.

More specifically, the polyester-urethane copolymer resin containing an ester repeating unit and a urethane repeating unit may be formed by, for example, reacting the above described polyester resin with isocyanate. In this case, an equivalence ratio of the polyester resin to the isocyanate may be, for example, 2:1 to 1:2, preferably, 1.5:1 to 1:1.5, more preferably, 1.2:1 to 1:1.2. Here, the equivalence ratio of the polyester resin to the isocyanate satisfies the numerical range, the coated exterior of a correspondingly formed primer layer may be excellent, such that optical properties may be significantly superior while characteristics such as solvent resistance, adhesion between the primer layer and the base film, and the like may be improved.

Then, the polyester-acrylic copolymer resin containing an ester repeating unit and an acrylic repeating unit, may be formed by for example, additionally polymerizing an acrylic monomer component with the polyester resin as described above. In this case, the polyester unit may serve to increase adhesion between the primer layer and the base film and the acrylic unit may further improve solvent resistance.

In this case, an usable acrylic monomer may be at least one selected from a group consisting of, for example, alkyl (meth)acrylate, alkyl acrylate, epoxy (meth)acrylate, hydroxy alkyl acrylate, alkyl (meth) acrylic acid including a carbonyl group, alkyl acrylic acid, and acrylate containing sulfonate. In this case, the acrylate containing sulfonate may be, for example, acrylate containing sodium 2-methyl-2-propene-1-sulfonate, acrylate containing sodium aryl sulfonate, acrylate containing 2propene-1-sulfonate, or the like. Meanwhile, among types of the acrylic monomer, in a case in which an epoxy acrylate monomer containing an epoxy group is copolymerized with the polyester resin, epoxy rings may be dissociated at high temperature and accordingly, the epoxy rings may be additionally polymerized and be cross-linked to improve high temperature durability of polyester main chains, thereby increasing high temperature stability.

If necessary, other monomers may be copolymerized in addition to the acrylic monomer components. In this case, as the other monomers, unsaturated nitriles such as (meth) acrylonitrile and the like; unsaturated amides such as (meth) acryl amides and the like; olefins such as ethylene, propylene and the like; β-unsaturated aliphatic monomers such as halogenated vinyl chloride, vinylidene chloride and the like; β-unsaturated aliphatic monomers such as halogenated vinyl chlor de, vinylidene chloride and the like; β-unsaturated aromatic monomers such as styrene, methyl styrene and the like; and the like may be used alone or in a combination of two or more thereof.

In particular, the polyester-acrylic copolymer resin according to an exemplary embodiment of the present may include two or more types of acrylic monomers, most preferably, an alkyl (meth)acrylate monomer and an epoxy (meth)acrylate monomer such as glycidyl (meth)acrylate.

As described above, in a case in which a polyester-acrylic copolymer is formed by including the acrylic monomers in the polyester resin, a weight ratio of the polyester resin to the acrylic monomers may be in the range of about 1:9 to 9:1, more preferably, in the range of about 2:8 to 8:2, most preferably, about 3:7 to 7:3. In a case in which the contents of the polyester resin and the acrylic monomers satisfy the numerical range, a coated exterior may be excellent, and characteristics such as adhesion between the primer layer and the base film, solvent resistance and the like may be excellent.

Meanwhile, the water dispersible resin may further include additional components within a range in which properties of the present disclosure are not suppressed, in addition to the components as described above.

Meanwhile, the water dispersible resin containing a sulfonic acid group may be manufactured by synthesizing water dispersible resins using monomers containing the sulfonic acid group. Meanwhile, the resin may include about 1 wt % to 20 wt %, preferably, about 2 wt % to 15 wt %, more preferably, about 5 wt % to 10 wt % of the monomers containing the sulfonic acid group. In a case in which the monomers containing the sulfonic acid group are included in an amount of less than 1 wt %, water dispersibility may be deteriorated. In a case in which the monomers containing the sulfonic acid group are included in an amount of greater than 20 wt %, attractive force between molecules due to the sulfonic acid group may be improved to lead to an increase in viscosity of a solution, such that a smooth stirring operation may not be performed, thereby resulting in difficulties in synthesization.

Next, the primer composition according to an exemplary embodiment of the present disclosure may include the water dispersible resin containing a sulfonic acid group, the water dispersible particles and water. A weight ratio of the water dispersible resin containing a sulfonic acid group to the water dispersible particles may be in the range of 1:0.01 to 5:1 or 1:0.01 to 4:1. In a case in which the weight ratio of the water dispersible resin containing a sulfonic acid group to the water dispersible particles satisfies the numerical range, the case may be preferable in terms of workability, rolling properties, slip properties, and transparency.

As the water dispersible particles usable in the exemplary embodiment of the present disclosure, any appropriate particles may be used and for example, inorganic particles, organic particles or combinations thereof may be used. The inorganic particles may be, for example, inorganic oxides such as silica, titania, alumina, zirconia, antimony, and the like. In addition, the organic particles may be, for example, a silicon resin, a fluorinated resin, a (meth)acrylic resin, a cross-linked polyvinyl alcohol, a melamine resin and the like.

Among the water dispersible particles, silica may be preferably used. Since silica is highly capable of suppressing blocking and has high levels of transparency, haze is rarely generated therein and coloring thereof is not caused, thereby slightly influencing optical properties of the polarizing plate. In addition, since colloidal silica has good dispersibility and dispersion stability in the primer composition, it has high workability at the time of forming the primer layer.

Meanwhile, the water dispersible particles may have an average diameter (an average primary diameter) of about 10 nm to 200 nm, more preferably, about 20 nm to 70 nm. When the average diameter of the water dispersible particles is smaller than 10 nm, since surface energy may be increased, condensation and precipitation of the water dispersible particles may be generated in the primer solution to degrade solution stability. When the average diameter of the water dispersible particles is greater than 200 nm, the water dispersible particles may be unevenly dispersed in the primer solution and agglomerate together, such that a size of the particle agglomerate may be greater than a wavelength of visible light (400 nm to 800 nm) to cause the scattering of light having a wavelength of 400 nm or more, thereby resulting in an increase in haze. By using the particles having the diameter within the range described above, unevenness portions may be suitably formed on a surface of the primer layer, such that frictional force of, in particular, a contact surface between the acrylic film and the primer layer or a contact surface between the primer layers may be effectively reduced. As a result, blocking may be further suppressed.

The primer composition according to the embodiment of the present disclosure is an aqueous composition, and thus, the particles may be provided as water dispersible materials and mixed in the composition. Specifically, in a case in which silica is used as the material of the particles, colloidal silica may be preferably mixed in the composition. As the colloidal silica, a product commercially available on the technical field of the present disclosure may be used as it is, and examples of the colloidal silica may include Snowtex series by Nissan Chemical Industries, Ltd., Aerosil series of Air Products, Epostar series and Soliostar RA series of Japan catalysts, LSH series of Ranco, and the like.

Next, the primer composition according to an exemplary embodiment of the present disclosure may include water in order to adjust viscosity thereof. In the primer composition according to the exemplary embodiment of the present disclosure, a solid content may be about 1 wt % to 30 wt %. In a case in which the solid content is less than 1 wt %, coating properties may be lowered to result in difficulties in the formation of the primer layer. In a case in which the solid content is greater than 30 wt %, the viscosity may be high to deteriorate leveling properties, such that exterior defects may be easily caused at the time of performing a coating process.

The primer composition according to the exemplary embodiment of the present disclosure may be applied to one surface or both surfaces of the acrylic film to form a primer layer in order to improve adhesive strength with respect to a non-aqueous adhesive and/or adhesive strength with respect to a functional coating layer. The primer composition according to the exemplary embodiment of the present disclosure may have superior water resistance and solvent resistance properties. Thus, even in a case in which a coating composition containing an organic solvent is applied to the primer layer, the coating composition may neither be easily separated from or be dissolved in the primer layer and may have superior adhesion maintained for a relatively long time.

Then, the acrylic film according to an exemplary embodiment of the present disclosure will be described.

The acrylic film may be formed of a single layer or may have a structure in which two or more films are stacked. In a case in which the acrylic film has two or more films stacked therein, the stacked films may be formed of the same material or different materials from each other.

Meanwhile, in the specification, the acrylic film refers to a film having a resin including an acrylate unit and/or a methacrylate unit as a main component. A concept of the acrylic film may include a film having a copolymer resin copolymerized with other monomer units in addition to the acrylate unit and/or the methacrylate unit and a blend resin having other resins blended with the acrylic resin, as well as a homopolymer resin formed of an acrylate unit and/or a methacrylate unit.

Examples of the monomer unit copolymerizable with the acrylic resin may include an aromatic vinyl unit, a 3 to 6-membered hetero ring unit substituted with a carbonyl group, an acrylic acid unit, a glycidyl unit and the like. In this case, the aromatic vinyl unit may be a unit derived from styrene, methyl styrene or the like, and the 3 to 6-membered hetero ring unit substituted with a carbonyl group may be a unit derived from a lactone ring, a glutaric anhydride, glutarimid, maleimide, a maleic anhydride, and the like.

By way of example, the acrylic film may be a film including a copolymer including a 3 to 10-membered hetero ring unit substituted with an alkyl(meth)acrylate unit and at least one carbonyl group. In this case, the 3 to 10-membered hetero ring unit substituted with a carbonyl group may be a unit derived from a lactone ring, a glutaric anhydride, glutarimid, a maleic anhydride, maleimide, and the like.

Another example of the acrylic film may be a film including a blend resin formed by blending an aromatic resin having a carbonate unit in a main chain thereof with the acrylic resin. In this case, the aromatic resin having a carbonate unit in a main chain thereof may be, for example, a polycarbonate resin, a phenoxy resin, or the like.

A manufacturing method of the acrylic resin film is not particularly limited, but the acrylic resin film may be manufactured in such a manner that an acrylic resin, a polymer, an additive, and the like are sufficiently mixed with one another through any appropriate mixing method to manufacture a thermoplastic resin composition and the composition is then formed as a film, or may be manufactured in such a manner that an acrylic resin, a polymer, an additive, and the like are fabricated as separate solutions and mixed with each other to form a uniform mixture solution and the mixture solution is then formed as a film.

The thermoplastic resin composition may be manufactured by extrusion-kneading a mixture obtained by free-blending raw materials of the film using any appropriate blender such as an Omni blender or the like. In this case, the blender used in the extrusion-kneading is not particularly limited, and for example, any appropriate blender including an extruder such as a single screw extruder or a twin screw extruder or a pressing kneader, may be used therefor.

A forming method of the film may be any appropriate method of forming a film, such as a solution casting method (solution flexibilization method), a melt extruding method, a calendar method, an extrusion molding method, or the like. Among these forming methods of the film, the solution casting method (solution flexibilization method), and the melt extruding method may be preferable.

Examples of a solvent used in the solution casting method (solution flexibilization method) may include an aromatic hydrocarbon solvent such as benzene, toluene, xylene or the like; an aliphatic hydrocarbon solvent such as cyclohexane, decaline or the like; an ester solvent such as acetic acid ethyl, acetic acid butyl or the like; a ketone solvent such as acetone, methyl ethyl ketone, methyl isobutyl ketone or the like; an alcohol solvent such as methanol, ethanol, isopropanol, butanol, isobutanol, methyl cellosolve, ethyl cellosolve, butyl cellosolve or the like; an ether solvent such as tetrahydrofuran, dioxane or the like; a halogenated hydrocarbon solvent such as dichloromethane, chloroform, carbon tetrachloride or the like; dimethyl formamide; dimethyl sulfoxide, and the like. These solvents may be used alone and in a combination of two or more thereof.

An apparatus for performing the solution casting method (solution flexibilization method) may be, for example, a drum-type casting machine, a band-type casting machine, a spin coater or the like. The melt extruding method may be, for example, a T-die method, an inflation method or the like. A forming temperature may be 150 to 350° C. and preferably, may be 200 to 300° C.

In the case of forming the film using the T-die method, a T-die is mounted on a leading edge of a single screw extruder or a twin screw extruder and a film extruded to have a film shape is rolled to thereby obtain a roll-shaped film. In this case, the rolled film may be stretched in an extruding direction and thus, may be uniaxially stretched by appropriately adjusting a temperature of the rolled film. In addition, the film is stretched in a direction perpendicular to the extruding direction, such that simultaneous biaxial stretching and successive biaxial stretching thereof and the like may be performed.

The acrylic film may be a non-stretched film or a stretched film. In the case of the stretched film, the stretched film may be a uniaxially stretched film or a biaxially stretched film. In the case of the biaxially stretched film, the biaxially stretched film may be a simultaneously biaxially stretched film or a successively biaxially stretched film. In the case in which the film is biaxially stretched, mechanical strength thereof may be enhanced and performance thereof may be improved. The acrylic film may be mixed with other thermoplastic resins, such that an increase in phase difference may be suppressed even in the case of stretching the film, and optical isotropy thereof may be maintained.

A stretching temperature may be within a range around a glass transition temperature of the thermoplastic resin composition, the raw material of the film. The stretching temperature may preferably be within a range of (glass transition temperature−30° C.) to (glass transition temperature+100° C.), more preferably, within a range of (glass transition temperature−20° C.) to (glass transition temperature+80° C.). When the stretching temperature is lower than (glass transition temperature−30° C.), a sufficient stretching ratio may not be obtained. On the contrary, when the stretching temperature is greater than (glass transition temperature+100° C.), flowage (flow) of the resin composition may occur, such that stable stretching may not be carried out.

A stretching ratio defined by an area ratio may be preferably 1.1 to 25 times, more preferably 1.3 to 10 times. When the stretching ratio is lower than 1.1 times, improvements in strength, accompanied with the stretching may not be generated. When the stretching ratio is greater than 25 times, an amount of effects corresponding to an increase in the stretching ratio may not be generated.

A stretching speed may be 10~20,000%/min, preferably, 100~10.000%/min, in one direction. When the stretching speed is less than 10%/min, a relatively long period of time is required in order to obtain a sufficient stretching ratio, causing an increase in manufacturing costs. When the stretching speed is greater than 20,000%/min, a fracture of the stretched film may occur.

The acrylic film may be subjected to a thermal treatment (annealing) after the stretching thereof, in order to stabilize optical isotropy thereof or mechanical properties. Conditions for the thermal treatment are not particularly limited, and any appropriate conditions commonly known in the art may be employed.

In an exemplary embodiment of the present disclosure, the primer composition according to the exemplary embodiment of the present disclosure may be coated on at least one surface of the acrylic film to form a primer layer. In this case, the coating may be performed by applying the primer composition to a base film and drying the composition, using a method commonly known in the technical field, for example, a bar coating method, a gravure coating method, a slot-die coating method, or the like. In this case, the drying may be performed in a convection oven or the like, but is not limited thereto. The coating layer may be dried at a temperature of 100° C. to 120° C. for 1 minute to 5 minutes. The drying temperature may be varied depending on a coating step. In a case in which stretching of a film has been completed, the drying thereof may be performed within a temperature range equal to or less than a glass transition temperature Tg of the film. In a case in which the film is stretched during the coating step, the drying thereof may be simultaneously performed with the stretching thereof at a stretching temperature, within a range equal to or less than a decomposition temperature Td of the film.

Meanwhile, the primer layer formed through the method as described above may a thickness of 50 nm to 1000 nm, preferably, 100 nm to 800 nm, more preferably, 200 nm to 500 nm. When the thickness of the primer layer is less than 50 nm, sufficient adhesion may not be secured. When the thickness of the primer layer is greater than 1000 nm, the drying thereof may be insufficiently performed or the water dispersible particles may be embedded in the primer layer, such that appropriate slip properties may not be provided.

Further, as necessary, a surface treatment may be performed on at least one surface of the acrylic film in order to improve adhesive strength or adhesion and in this case, a surface treatment method may be at least one selected from a group consisting of an alkali treatment, a corona treatment, and a plasma treatment. In particular, in a case in which an optical film used in the present disclosure is an acrylic film having no lactone ring, it may be preferable to perform the surface treatment.

Meanwhile, after the primer layer is formed on at least one surface of the acrylic film as described above, a functional coating layer such as a hard coating layer, a reflection prevention layer or the like may be disposed on the primer layer.

In this case, various compositions of the functional coating layer may be formed depending on intended functions thereof. For example, the functional coating layer may be formed of a composition for forming the functional coating layer, the composition including a binder resin, particles, a solvent and the like.

For example, according to the exemplary embodiment of the present disclosure, in the composition for forming the functional coating layer, the binder resin may be an acrylic binder resin, a urethane binder resin or mixtures thereof, which are commonly known in the technical field.

Types of the acrylic binder resin are not particularly limited and may be selectively used without particular limitations, as long as they are known in the technical field. Examples of the acrylic binder resin may include an acrylate monomer, an acrylate oligomer, or mixtures thereof. In this case, the acrylate monomer or the acrylate oligomer may include at least one acrylate functional group that may be added in a curing reaction.

Types of the acrylate monomer and the acrylate oligomer are not particularly limited, as long as they are commonly used in the technical field to which the present disclosure belongs.

Further, the acrylate oligomer may be a urethane acrylate oligomer, an epoxy acrylate oligomer, polyester acrylate, polyether acrylate or a mixture thereof. The acrylate monomer may be dipentaerythritol hexaacrylate, dipentaerythritol hydroxy pentaacrylate, pentaerythritol tetraacrylate, pentaerythritol triacrylate, trimethylene profile triacrylate, propoxylated glycerol triacrylate, trimethylolpropane ethoxy triacrylate, 1,6-hexanediol diacrylate, propoxylated glycerol triacrylate, tripropylene glycol diacrylate, ethylene glycol diacrylate, or mixtures thereof, but is not limited thereto.

Meanwhile, as the particles, organic particles, inorganic particles, or mixtures thereof, may be used. The content of the particles is not limited, but the particles may be included in an amount of 0.1 parts by weight to 10 parts by weight with respect to 100 parts by weight of the binder resin. In a case in which the content of the particles satisfies the numerical range, a sufficient haze value may be realized, and good coating properties may be secured.

Meanwhile, in a case in which the mixture of organic particles and inorganic particles is used as the particles, the inorganic particles may be included in an amount of 20 parts by weight to 80 parts by weight with respect to 100 parts by weight of the organic particles. When the content of the inorganic particles satisfies the numerical range, scratch resistance properties may be excellent and a good coating surface may be obtained.

In addition, the inorganic particles may be one or two or more selected from silica, silicon particles, aluminium hydroxide, magnesium hydroxide, alumina, zirconia, and titania, but are not limited thereto.

The organic particles may be at least one selected from polystyrene, polymethyl methacrylate, polymethyl acrylate, polyacrylate, polyacrylate-co-styrene, poly methyl acrylate-co-styrene, polymethylmethacrylate-co-styrene, polycarbonate, polyvinyl chloride, polybutylene terephthalate, polyethylene terephthalate, polyamide, polyimide, polysulfone, polyphenylene oxide, polyacetal, epoxy resin, phenol resin, silicone resin, melamine resin, benzoguamine, polydivinylbenzene, polydivinylbenzene-co-styrene, polydivinylbenzene-co-acrylate, poly diallyl phthalate, and triallyl isocyanurate polymers, or may be a copolymer of two or more thereof.

Meanwhile, the solvent is not limited, but may be included in an amount of 50 parts by weight to 500 parts by weight with respect to 100 parts by weight of the binder resin. In a case in which the content of the solvent satisfies the numerical range, coating properties of the functional coating layer may be superior, coating film strength may be excellent, and the manufacturing of the film having an increased thickness may be facilitated.

Types of the solvent usable according to the exemplary embodiment of the present disclosure are not particularly limited, but in general, an organic solvent may be used. For example, the solvent may be at least one selected from a group consisting of low grade alcohols such as $C_1$ to $C_6$, acetates, ketones, cellosolve, dimethyl formamide, tetrahydrofuran, propylene glycol monomethyl ether, toluene and xylene.

Here, the low grade alcohols may be one selected from methanol, ethanol, isopropyl alcohol, butyl alcohol, isobutyl alcohol and diacetone alcohol, and the acetates may be one selected from methyl acetate, ethyl acetate, isopropyl acetate, butyl acetate and cellosolve acetate. The ketones may be one selected from methylethylketone, methylisobutylketone, acetylacetone and acetone, but is not limited thereto.

Meanwhile, the composition for forming the functional coating layer may further include an UV curing initiator added to perform curing through the irradiation of UV light. The UV curing initiator is not limited, but may be one selected from 1-hydroxy cyclohexylphenyl ketone, benzyl dimethyl ketal, hydroxy dimethyl acetophenone, benzoin, benzoin methyl ether, benzoin ethyl ether, benzoin isopropyl ether, and benzoin butyl ether, or be a combination of two or more thereof.

The UV curing initiator may be added in an amount of 0.1 parts by weight to 10 parts by weight with respect to 100 parts by weight of the binder resin. In a case in which the content of the UV curing initiator satisfies the numerical range, sufficient curing may be performed and film strength may be improved.

In addition, the composition for forming the functional coating layer according to the exemplary embodiment of the present disclosure may further include, at least one additive selected from a leveling agent, a wetting agent, and a defoaming agent. The additive may be added in an amount of 0.01 parts by weight to 10 parts by weight with respect to 100 parts by weight of the binder resin.

In the exemplary embodiment of the present disclosure, a thickness of the functional coating layer is not limited to, but may be about 1 μm to 20 μm, preferably, about 1 μm to 4 μm. In a case in which the thickness of the functional coating layer satisfies the numerical range, sufficient functionality may be implemented while the occurrence of cracks may be prevented.

Meanwhile, the functional coating layer may be formed by a method of applying the composition for forming the functional coating layer to the primer layer and subsequently, drying and/or curing the composition. In this case, the applying may be performed by coating methods commonly known in the technical field, for example, wet coating methods such as a roll coating method, a bar coating method, a spray coating method, a dip coating method and a spin coating method. However, the coating methods are not limited thereto and other various coating methods used in the technical field may also be employed.

Meanwhile, the drying and/or curing may be performed by irradiating heat and/or light onto the composition for forming the functional coating layer, coated on the primer layer. The drying process and the curing process may be sequentially undertaken or may be simultaneously undertaken. However, in consideration of processing convenience, the curing process may be preferably performed by irradiating light such as UV light.

Meanwhile, curing conditions may be appropriately controlled depending on a mixing ratio and ingredients of the composition for forming the functional coating layer. For example, in the case of an electron beam or UV light curing process, the curing may be performed in an irradiation amount of 200 mJ/cm$^2$ to 1,000 mJ/cm$^2$ for about 1 second to 10 minutes. In the electron beam or UV light curing process, in a case in which curing time satisfies the numerical range, since the binder resin may be sufficiently cured, mechanical properties such as wear resistance may be excellent and durability of a transparent base film may be improved.

The polarizing plate according to the embodiment of the present invention may further include a separate layer for other purposes, in addition to the functional coating layer. For example, the polarizing plate may further include a contamination-resistant layer in order to prevent contamination on a display surface and in addition to this, may further include various layers in order to implement various purposes.

Meanwhile, according to an exemplary embodiment of the present disclosure, in a case in which primer layers are formed on both surfaces of the acrylic film, constitutions of primer compositions applied to the both surfaces may be the same each other or different from each other. For example, primer layers may be respectively formed on both surfaces of the acrylic film using an aqueous primer composition containing a sulfonic acid group. Alternatively, a primer layer may be formed on one surface of the acrylic film, using an aqueous primer composition containing a sulfonic acid group, while another primer layer may be formed on the other surface of the acrylic film, using an aqueous primer composition containing no sulfonic acid group. Further, even in case in which the aqueous primer composition containing a sulfonic acid group is applied to both surfaces of the acrylic film, primer compositions having different constitutions may be applied to the respective surfaces. For example, primer layers may be formed on both surfaces of the acrylic film, using primer compositions containing different base resins.

Then, as the polarizer, any polarizer generally used in the technical field may be used without limitations. For example, the polarizer according to the exemplary embodiment of the present disclosure may be manufactured by dyeing a polyvinyl alcohol film with a dichromatic dye and/or iodine or the like and cross-linking and stretching the film.

The adhesive layer provided for attaching the polarizer to the acrylic film may be formed of an aqueous adhesive or a non-aqueous adhesive commonly used in the technical field. For example, in the adhesive layer, a polyvinyl alcohol (PVA) adhesive, an acrylic adhesive, an epoxy adhesive, a urethane adhesive and the like may be used without limitations. In consideration of adhesion with respect to the polarizer, a PVA adhesive may be preferable among the types of adhesive. Among types of PVA adhesive, a modified PVA adhesive including an acetoacetyl group and the like may be preferable. Specific examples of the PVA adhesive may include Gohsefimer Z-100, Z-200, Z-200H, Z-210, Z-220, Z-320 and the like, manufactured by the Nippon synthetic Chemical Industry Co., Ltd., but are not limited thereto.

Meanwhile, the non-aqueous adhesive is not particularly limited, as long as it is a UV-curable adhesive. However, the non-aqueous adhesive may be an adhesive using an optical radical polymerization, such as a (meth)acrylate adhesive, an ene/thiol adhesive, or an unsaturated polyester adhesive; an adhesive using a cationic photopolymerization such as an epoxy adhesive, an oxetane adhesive, an epoxy/oxetane adhesive, or a vinyl ether adhesive, or the like. Adhesion between the polarizer and the protective film using the non-aqueous adhesive may be performed in such a manner that after an adhesive layer is formed by coating an adhesive composition, the polarizer and the protective film are laminated and then light is irradiated thereon to thereby harden the adhesive composition.

The polarizing plate according to the exemplary embodiment of the present disclosure may have superior optical properties such as transmittance, a degree of polarization, color, and the like. Further, adhesion between the protective film and the functional coating layer may be excellent.

Further, the optical film or the polarizing plate according to the exemplary embodiment of the present disclosure may be usefully applied to various image display devices such as a liquid crystal display device or the like.

MODE FOR DISCLOSURE

Manufacturing Example 1

Manufacturing of Composition for Forming Functional Coating Layer 10 g of a urethane acrylate oligomer as a binder resin; 20 g of dipentaerythritol hexaacrylate (PEHA) as a multifunctional acrylate monomer; 2 g of polyacrylate-co-styrene particles having an average diameter of 3.5 μm and a refractive index of 1.59, as organic particles; 2 g of silicon particles having an average diameter of 4 μm and a refractive index of 1.43, as inorganic particles; 30 g of ethanol and 30 g of 2-butanol as organic solvents; and 2 g of a UV curing initiator were uniformly mixed to manufacture a composition for preparing an anti-glare layer. In this case, a refractive index of the binder resin was about 1.51 to 1.53.

Manufacturing Example 2

Manufacturing of Primer Resin and Primer Composition (1) Synthesization of Polyester Resin a Containing Sulfonic Acid Group and Manufacturing of Primer Composition A An interior of a 500 ml flask having a rounded bottom was substituted with nitrogen. Ethylene glycol, 2-methyl-1,3-propanediol, sodium sulfonyl isophthalic acid, and isophthalic acid were introduced into the flask at a mole ratio of 0.5:0.5:0.5:0.5 and then, esterification was conducted at a temperature of 200° C. for two hours to drain a theoretical amount of water. After water was continuously drained by adding tetramethyl titanate, antimony acetate, and t-butyl tin oxide as catalysts and adding trimethyl phosphate as a stabilizer, a polycondensation reaction was performed at a temperature of 255 degrees under decompression conditions of 2.5 Torr or less for 150 minutes to thereby manufacture a polyester resin A.

Next, 40 parts by weight of the polyester resin A containing a sulfonic acid group as manufactured above, 3 parts by weight of silica, and 57 parts by weight of water were mixed to manufacture a primer composition A.

(2) Synthesization of Polyurethane Resin B Containing Sulfonic Acid Group and Manufacturing of Primer Composition B An interior of a 500 ml flask having a rounded bottom was substituted with nitrogen. Ethylene glycol, 2-methyl-1,3-propanediol, sodium sulfonyl isophthalic acid, and isophthalic acid were introduced into the flask at a mole ratio of 0.5:0.5:0.5:0.5 and then, esterification was conducted at a temperature of 200° C. for two hours to drain a theoretical amount of water. After water was continuously drained by adding tetramethyl titanate, antimony acetate, and t-butyl tin oxide as catalysts and adding trimethyl phosphate as a stabilizer, a polycondensation reaction was performed under decompression conditions of 2.5 Torr or less for 50 minutes. After 40 g of polyester diol synthesized as above and 5 g of ethylene glycol were added to 60 g of methyl ethyl ketone and the mixture was sufficiently stirred to dissolve the additives therein, 40 g of isophorone diisocyanate was added to the mixture and subsequently, a reaction process was performed at a temperature of 75° C. for 1 hour to obtain a prepolymer solution. Then, the prepolymer solution was cooled to 40° C. and 300 g of water was added thereto. Subsequently, the prepolymer solution to which water was added was agitated at a high rate, using a homo-mixer, whereby emulsification thereof was performed. 5 g of ethylene glycol was introduced to the emulsion to perform a chain extension reaction therein and then, the emulsion was heated and decompressed to remove methyl ethyl ketone therefrom, whereby an aqueous polyurethane resin solution B having 30% of a solid content was obtained.

Next, 23.3 parts by weight of the aqueous polyurethane resin solution B manufactured as above, 1.8 parts by weight of silica, and 74.9 parts by weight of water were mixed to manufacture a primer composition B.

(3) Synthesization of Polyester-Acrylic Copolymer Resin C Containing Sulfonic Acid Group and Manufacturing of Primer Composition C An interior of a 500 ml flask having a rounded bottom was substituted with nitrogen. Ethylene glycol, 2-methyl-1,3-propanediol, sodium sulfonyl isophthalic acid, and isophthalic acid were introduced into the flask at a mole ratio of 0.5:0.5:0.5:0.5 and then, esterification was conducted at a temperature of 200° C. for two hours to drain a theoretical amount of water. After water was continuously drained by adding tetramethyl titanate, antimony acetate, and t-butyl tin oxide as catalysts and adding trimethyl phosphate as a stabilizer, a polycondensation reaction was performed under decompression conditions of 2.5 Torr or less for 50 minutes. Thereafter, glycidyl (meth) acrylate and methyl (meth) acrylate were introduced into the flask at a weight ratio of 2:1 and then, cooled. The mixture was agitated in water at a high rate, and a reactant and a thermal initiator were introduced to the mixture to manufacture a polyester-acrylic copolymer resin C with an increased temperature of 80° C. for 2 hours.

Next, 40 parts by weight of the polyester-acrylic copolymer resin C manufactured as above, 3 parts by weight of silica, and 57 parts by weight of water were mixed to manufacture a primer composition C.

(4) Synthesization of Polyester-Acrylic Copolymer Resin D Containing Sulfonic Acid Group and Manufacturing of Primer Composition D An interior of a 500 ml flask having a rounded bottom was substituted with nitrogen. Ethylene glycol, 2-methyl-1,3-propanediol, sodium sulfonyl isophthalic acid, and adipic acid were introduced into the flask at a mole ratio of 0.5:0.5:0.5:0.5 and then, esterification was conducted at a temperature of 200° C. for two hours to drain a theoretical amount of water. After water was continuously drained by adding tetramethyl titanate, antimony acetate, and t-butyl tin oxide as catalysts and adding trimethyl phosphate as a stabilizer, a polycondensation reaction was performed under decompression conditions of 2.5 Torr or less for 50 minutes. Thereafter, glycidyl (meth) acrylate and methyl (meth) acrylate were introduced to the flask at a weight ratio of 2:1 and then, cooled. The mixture was agitated in water at a high rate, and a reactant and a thermal initiator were introduced to the mixture to manufacture a polyester-acrylic copolymer resin D with an increased temperature of 80° C. for 2 hours.

Next, 23.3 parts by weight of the polyester-acrylic copolymer resin D manufactured as above, 1.8 parts by weight of silica, and 74.9 parts by weight of water were mixed to manufacture a primer composition D.

(5) Synthesization of Polyurethane Resin E Containing Non-Ionic Components and Manufacturing of Primer Composition E After 60 g of methyl ethyl ketone was added to 48 g of polycarbonate diol (Asahi Kasei, a molecular weight: 2000) and the mixture was sufficiently stirred to dissolve the additive therein, 40 g of isophorone diisocyanate was added to the mixture and subsequently, a reaction process was performed at a temperature of 75° C. for 1 hour. After the completion of the reaction process, the mixture was cooled to a temperature of 60° C. and 12 g of polyethylene glycol was added to and reacted with the mixture at a temperature of 75° C. to thereby obtain a prepolymer solution.

Then, the prepolymer solution was cooled to 40° C. and a surfactant and 233 g of water were added thereto. Subsequently, the prepolymer solution to which the surfactant and water were added was agitated at a high rate, using a homo-mixer, whereby emulsification thereof was performed. Thereafter, the emulsion was heated and decompressed to remove methyl ethyl ketone therefrom, whereby an aqueous polyurethane resin E solution was obtained.

Next, 23.3 parts by weight of the aqueous polyurethane resin E solution manufactured as above, 1.8 parts by weight of silica, and 74.9 parts by weight of water were mixed to manufacture a primer composition E.

(6) Synthesization of Polyurethane Resin F Containing Carboxyl Group and Manufacturing of Primer Composition F After 60 g of methyl ethyl ketone was added to 48 g of polycarbonate diol (Asahi Kasei, a molecular weight: 2000) and the mixture was sufficiently stirred to dissolve the additive therein, 40 g of isophorone diisocyanate was added to the mixture and subsequently, a reaction process was performed at a temperature of 75° C. for 1 hour. After the completion of the reaction process, the mixture was cooled to a temperature of 60° C. and 12 g of dimethylolpropionic acid was added to and reacted with the mixture at a temperature of 75° C. to thereby obtain a prepolymer solution.

Then, the prepolymer solution was cooled to 40° C. and 233 g of water was added thereto. Subsequently, the prepolymer solution to which water was added was agitated at high speed, using a homo-mixer, whereby emulsification thereof was performed, followed by neutralization with triethylamine and a chain extension reaction with isophorone diamine. Thereafter, the emulsion was heated and decompressed to remove methyl ethyl ketone therefrom, whereby an aqueous polyurethane resin F solution was obtained.

Next, 23.3 parts by weight of the aqueous polyurethane resin F manufactured as above, 1.8 parts by weight of silica, and 74.9 parts by weight of water were mixed to manufacture a primer composition F.

(7) Synthesization of Polyester-Urethane Copolymer Resin G Containing Sulfonic Acid and Manufacturing of Primer Composition G An interior of a 500 ml flask having a rounded bottom was substituted with nitrogen. Ethylene glycol, 2-methyl-1,3-propanediol, sodium sulfonyl isophthalic acid, and adipic acid were introduced into the flask at a mole ratio of 0.5:0.5:0.5:0.5 and then, esterification was conducted at a temperature of 200° C. for two hours to drain a theoretical amount of water. After water was continuously drained by adding tetramethyl titanate, antimony acetate, and t-butyl tin oxide as catalysts and adding trimethyl phosphate as a stabilizer, a polycondensation reaction was performed under decompression conditions of 2.5 Torr or less for 50 minutes to thereby manufacture a polyester resin. After 60 g of methyl ethyl ketone was added to 45 g of the polyester resin and the mixture was sufficiently stirred to dissolve the additive therein, 40 g of isophorone diisocyanate was added to the mixture and subsequently, a reaction process was performed at a temperature of 75° C. for 1 hour. After the completion of the reaction process, the mixture was cooled to a temperature of 60° C., and 10 g of dimethylolpropionic acid and 5 g of ethylene glycol were added to and reacted with the mixture at a temperature of 75° C. to thereby obtain a prepolymer solution. Then, the prepolymer solution was cooled to 40° C. and 300 g of water and 6 g of triethylamine were added thereto. Subsequently, the prepolymer solution to which water and triethylamine were added was agitated at high speed, using a homo-mixer, whereby emulsification thereof was performed. Thereafter, the emulsion was heated and decompressed to remove methyl ethyl ketone therefrom, whereby a polyester-urethane copolymer resin G having 30% of a solid content was obtained.

Next, 23.3 parts by weight of the polyester-urethane copolymer resin G manufactured as above, 1.8 parts by weight of silica, and 74.9 parts by weight of water were mixed to manufacture a primer composition G.

Manufacturing Example 3

Manufacturing of Acrylic Film Having One Surface on which Primer Layer is Formed After the primer composition F manufactured according to the Manufacturing Example 2.(6) was coated on one surface of an acrylic film corona-treated under conditions of 50 W/m²/min and uniaxially stretched in a machine direction (MD), using a #5 bar and was then, dried at a temperature of 100° C. for 1 minute, the film was uniaxially stretched in a transverse direction (TD) at a temperature of 140° C., whereby an acrylic film having one surface on which a primer layer was formed at a thickness of 300 nm was manufactured.

Inventive Example 1

After the primer composition C manufactured according to the Manufacturing Example 2.(3) was coated on one surface of an acrylic film corona-treated and uniaxially stretched in a machine direction (MD), using a #7 bar and was then, dried at a temperature of 100° C. for 3 minutes, while the primer composition D manufactured according to the Manufacturing Example 2.(4) was coated on the other surface of the acrylic film, using a #5 bar, the film was uniaxially stretched in a transverse direction (TD), whereby an acrylic film having both surfaces on which primer layers were formed at thicknesses of 600 nm and 300 nm, respectively, was manufactured. The surfaces of the acrylic film were subjected to a corona treatment under conditions of 50 W/m²/min.

Next, after the composition for forming the functional coating layer manufactured according to Manufacturing Example 1 was coated on the surface of the acrylic film on which the primer composition C was coated, to have a thickness of 4 μm after drying, using a bar coating method, 280 mJ/cm² of UV light was irradiated thereon to harden the coating layer, whereby an acrylic film on which a functional coating layer was formed was obtained.

Thereafter, an UV adhesive was applied to both surfaces of a PVA element using a dropping pipette. The acrylic film on which the functional coating layer was formed was disposed on one surface of the PVA element, while the acrylic film manufactured according to the Manufacturing Example 3 was disposed on the other surface of the PVA element. Then, after conditions were set such that a final adhesive layer has a thickness of 1.5 μm, the PVA element passed through a laminator (5 m/min). Then, 500 mJ/cm² of UV light was irradiated thereon using a UV irradiation device (metal halide lamp) to thereby manufacture a polarizing plate.

In this case, the acrylic film on which the functional coating layer was formed was disposed in such a manner that a surface of the acrylic film, opposite to the surface thereof on which the functional coating layer was formed, that is, a surface of the acrylic film on which the primer composition D was coated, was disposed toward a polarizer.

Inventive Example 2

A polarizing plate was manufactured by the same method as that of Inventive Example 1, with the exception that the primer composition A manufactured according to the Manufacturing Example 2.(1) was used instead of the primer composition C, and the primer composition B manufactured according to the Manufacturing Example 2.(2) was used instead of the primer composition D.

Inventive Example 3

After the primer composition C manufactured according to the Manufacturing Example 2.(3) was coated on one surface of an acrylic film corona-treated and uniaxially stretched in a machine direction (MD), using a #7 bar and was then, dried at a temperature of 100° C. for 3 minutes, while the primer composition F manufactured according to the Manufacturing Example 2.(6) was coated on the other surface of the acrylic film, using a #5 bar, the film was uniaxially stretched in a transverse direction (TD), whereby an acrylic film having both surfaces on which primer layers were formed at thicknesses of 600 nm and 300 nm, respectively, was manufactured. The surfaces of the acrylic film were subjected to a corona treatment under conditions of 50 W/m²/min.

Next, after the composition for forming the functional coating layer manufactured according to Manufacturing Example 1 was coated on the surface of the acrylic film on which the primer composition C was coated, to have a thickness of 4 μm after drying, using a bar coating method, 280 mJ/cm² of UV light was irradiated thereon to harden the coating layer, whereby an acrylic film on which a functional coating layer was formed was obtained.

Thereafter, a polyvinyl alcohol adhesive was applied to both surfaces of a PVA element. The acrylic film on which the functional coating layer was formed was disposed on one surface of the PVA element, while an alkali treated TAC film was disposed on the other surface of the PVA element. Then, the PVA element was pressurized using a pressing roll and then was hot air-dried at a temperature of 80° C. for 5 minutes to thereby manufacture a polarizing plate. In this case, the acrylic film on which the functional coating layer was formed was disposed in such a manner that a surface of the acrylic film, opposite to the surface thereof on which the functional coating layer was formed, that is, a surface of the acrylic film on which the primer composition F was coated, was disposed toward a polarizer.

Inventive Example 4

A polarizing plate was manufactured by the same method as that of Inventive Example 1, with the exception that the primer composition G manufactured according to the Manufacturing Example 2.(7) was used instead of the primer composition C.

Comparative Example 1

A polarizing plate was manufactured by the same method as that of Inventive Example 1, with the exception that the primer composition F manufactured according to the Manufacturing Example 2.(6) was used instead of the primer composition C, and the primer composition E manufactured according to the Manufacturing Example 2.(5) was used instead of the primer composition D.

Experimental Example 1

Method of Measuring Adhesion of Functional Coating Layer

After cuts were made at intervals of 1 mm in length and width directions in an area of 10 cm×10 cm of each functional coating layer of the polarizing plates, manufactured according to Inventive Examples 1 to 4 and Comparative Example 1, tape was adhered to the functional coating layer and then was detached from the functional coating layer, whereby adhesive strength of the functional coating layer was calculated depending on a degree to which the functional coating layer was peeled off with the tape. In a case in which an area of the layer peeled off with the tape was 20% or less as compared to the area of the layer, the case was considered to be OK, while in a case in which an area of the layer peeled off with the tape was greater than 20% as compared to the area of the layer, the case was considered to be NG. The measurement results are described in the following [Table 1].

Experimental Example 2

Method of Measuring Adhesion with Respect to Adhesive Layer

With regard to the respective polarizing plates manufactured according to Inventive Examples 1 to 4, 90-degree peeling force was measured using a TA.XT.Plus (Stable Micro Systems) texture analyzer. Samples respectively having a width of 2 cm and a length of 8 cm were fabricated and acrylic film surfaces thereof were respectively fixed to a bottom surface of the analyzer to thereby measure 90-degree peeling force. In this case, a measurement distance was 5 cm. The measurement results of peeling force are described in the following [Table 1]. In a case in which peeling force was 2N or more, the case was considered to be OK, while in a case in which peeling force was less than 2N, the case was considered to be NG.

TABLE 1

| Classification | Primer Composition on surface, opposite to polarizer adhesion surface | Primer Composition on polarizer adhesion surface | Adhesion of Functional Coating Layer | Adhesion With Respect To Adhesive Layer |
|---|---|---|---|---|
| Inventive Example 1 | C | D | OK | OK |
| Inventive Example 2 | A | B | OK | OK |
| Inventive Example 3 | C | F | OK | OK |
| Inventive Example 4 | G | D | OK | OK |
| Comparative Example 1 | F | E | NG | NG |

As described in the [Table 1], in the case of Inventive Examples 1, 2 and 4 using the primer compositions containing a sulfonic acid group, all degrees of adhesion with respect to the non-aqueous adhesive layer and adhesion with respect to the functional coating layer were superior. On the other hand, in the case of Comparative Example 1 using the primer composition containing no sulfonic acid group, all degrees of adhesion with respect to the non-aqueous adhesive layer and adhesion with respect to the hard coating layer were defective.

In addition, as described in Inventive Example 3, in the case of using the aqueous adhesive, a primer layer may be formed on one surface of the acrylic film, using the primer composition containing a sulfonic acid group, while a primer layer may be formed on the other surface of the acrylic film, using a primer composition according to the related art, whereby a polarizing plate having superior adhesive properties may be manufactured.

While the present disclosure has been shown and described in connection with the embodiments, it will be apparent to those skilled in the art that modifications and variations can be made without departing from the spirit and scope of the disclosure as defined by the appended claims.

The invention claimed is:
1. A polarizing plate comprising:
a polarizer;
an acrylic film attached to at least one surface of the polarizer via an adhesive layer; and
a primer layer formed on at least one surface of the acrylic film,
wherein the primer layer is formed of a primer composition including a water dispersible resin containing a sulfonic acid group, water dispersible particles, and water, and
a weight ratio of the water dispersible resin to the water dispersible particles is in a range of 1:0.01 to 5:1, wherein the water dispersible resin is a polyester-acrylic copolymer resin containing an ester repeating unit and an acrylic repeating unit or a polyester-urethane copolymer resin containing an ester repeating unit and a urethane repeating unit.
2. The polarizing plate of claim 1, wherein the water dispersible resin includes 1 wt % to 20 wt % of monomers containing the sulfonic acid group.

3. The polarizing plate of claim 1, wherein the polyester-acrylic copolymer resin or the polyester-urethane copolymer resin includes a repeating unit represented by Chemical Formula 1:

[Chemical Formula 1]

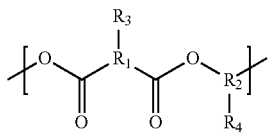

where $R_1$ and $R_2$ each independently indicate hydrogen, a substituted or unsubstituted $C_{1-20}$ alkyl group, a substituted or unsubstituted $C_{1-20}$ aryl group or a substituted or unsubstituted $C_{3-20}$ cycloalkyl group,
$R_3$ and $R_4$ each independently indicate hydrogen, a substituted or unsubstituted $C_{1-20}$ alkyl group, a substituted or unsubstituted $C_{1-20}$ aryl group or a substituted or unsubstituted $C_{3-20}$ cycloalkyl group, or a sulfonate group, and
at least one of $R_3$ and $R_4$ is a sulfonate group.
4. The polarizing plate of claim 1, wherein the water dispersible particles have an average diameter of 10 nm to 200 nm.
5. The polarizing plate of claim 1, wherein the water dispersible particles are at least one type of inorganic particles selected from a group consisting of silica particles, titania particles, alumina particles, zirconia particles, and antimony particles; at least one type of organic particles selected from a group consisting of a silicon resin, a fluorinated resin, a (meth)acrylic resin, a cross-linked polyvinyl alcohol resin and a melamine resin; or combinations thereof.
6. The polarizing plate of claim 1, further comprising: a functional coating layer on a surface of the acrylic film, opposite to the surface thereof disposed toward the polarizer.
7. The polarizing plate of claim 1, wherein the acrylic film includes a copolymer including a 3- to 6-membered hetero ring unit substituted with an alkyl(meth)acrylate unit and at least one carbonyl group.
8. The polarizing plate of claim 7, wherein the acrylic film further includes an aromatic resin having a carbonate unit in a main chain thereof.

* * * * *